United States Patent Office 2,723,935
Patented Nov. 15, 1955

2,723,935

SHEET MATERIAL

Ernest A. Rodman, Newburgh, N. Y., assignor to E. I. du Pont de Nemours and Company, Wilmington, Del., a corporation of Delaware No Drawing. Application October 1, 1954,
Serial No. 459,839

20 Claims. (Cl. 154—101)

This invention relates to non-woven sheet material and, more particularly, to such materials wherein matted polymeric linear terephthalate ester fibers are bound together by a polymeric diisocyanate elastomer.

Various types of fibers and binders have been employed in the construction of non-woven fibrous sheets for a variety of uses. Many attempts have been made to duplicate the appearance and properties of leather. Usually when the appearance is achieved one or more of the properties such as water vapor permeability, flex life, abrasion resistance, and tensile strength are not present, and vice versa.

The primary object of this invention is to provide a new sheet material of the type in which matted polymeric linear terephthalate ester fibers are bound together with a polymeric diisocyanate elastomer. A further object is the provision of a sheet material which has the appearance of leather combined with the properties of leather. A still further object is to provide a leather replacement product having a degree of water vapor permeability comparable to that used in shoe uppers. A still further object is the provision of a non-woven sheet material having high abrasion or scuff resistance. A still further object is the provision of porous paperlike products. Other important objects will be apparent from the description of the invention given hereinafter.

The above objects are accomplished according to the present invention by forming a sheet material comprising a batt of polymeric linear terephthalate staple filaments bound together with a polymeric elastomer obtained by reactions involving a polyalkyleneether glycol having a molecular weight of at least 750, an organic diisocyanate and a chain-extending compound containing active hydrogen atoms, such as, e. g., water, hydrogen sulfide or an organic compound containing active hydrogen atoms attached to two different atoms in the molecule. The polymeric elastomers and their preparation are fully described in copending application Serial No. 365,270, filed June 30, 1953, by F. B. Hill, Jr.

Throughout the specification and appended claims the term "polymeric linear terephthalate ester fibers" refers to highly polymerized linear ester fibers of terephthalic acid and a glycol of the series $HO(CH_2)_nOH$, where $n$ is a whole number within the range of 2 to 10, inclusive. The polymeric linear terephthalate ester fibers may be prepared in accordance with the teaching set forth in U. S. Patent 2,465,319, issued March 22, 1949, to J. R. Whinfield et al.

Throughout the specification and claims the terms "fiber" and "filament" are used synonomously and embrace both staple and continuous filaments.

The high strength and suppleness of the sheet material produced in accordance with this invention depends to a large extent on the affinity between the polymeric linear terephthalate fibers and the above mentioned polymeric elastomer binder. When the degree of adhesion between the fiber and binder is too great the fibers are cemented together in such a manner that they may be broken one at a time when a stress is applied, which results in low tear strength. If the degree of adhesion between fiber and binder is too low a high tensile strength sheet material is not realized. The degree of adhesion between the polymeric linear terephthalate fibers and polymeric elastomer binder is such that products of this invention are flexible and have both high tear and tensile strengths.

The batts of polymeric linear terephthalate fibers may be prepared by a variety of techniques, such as, e. g., paper making technique, carding, deposited from air stream or any suitable web forming apparatus.

The following specific examples are given by way of illustration and not limitation. Throughout the specification and appended claims the parts and percentage figures are expressed on a weight basis.

Example 1

A fluffy loosely bound batt of .1 denier 1.25 inch staple polyethylene terephthalate fibers, weighing about 6 ounces per square yard, was formed on a card. The batt was immersed in a 3% solution of a polytetramethyleneether glycol/toluene diisocyanate elastomer in dimethyl formamide. The excess solution was pressed from the batt, then dried at about 200° F. Upon drying, the fibers became compacted and the dried material was a fibrous leather-like sheet. There was a tendency for the elastomer to migrate toward the surface of the sheet on drying, thus the ratio of binder to fiber was greater in the surface portion of the sheet than in the middle portion.

The polytetramethyleneether glycol/toluene diisocyanate elastomer employed in the above example was prepared by mixing together in a Werner-Pfleiderer mixer at 70–80° C. for 3 hours one molar proportion of a polytetramethyleneether glycol of molecular weight of 3230 and 2.1 molar proportions of 2,4-tolylene diisocyanate. Then 5.11 molar proportions of water were added and mixing was continued for 33 minutes, the temperature rising to about 135° C. At the end of this time the reaction mass was in the form of rubbery chunks. It was removed from the mixer and put on a rubber roll mill where 0.74 part of piperidene was added for each 100 parts, by weight, of the polymer. When thoroughly mixed, the stabilized elastomer was sheeted off the mill.

The ratio of fiber to binder (elastomer) throughout the entire sheet was 1.0 to 1.2. The LPV (leather permeability value) was 1000 at 78° F. and 90% relative humidity when tested in accordance with the procedure described hereinafter. The fibrous sheet withstood 1,500,000 flexes on the Schiltknecht flex apparatus before the first surface crack appeared.

The product was highly abrasion resistant. The surface could not be marred by over 50 hand scrapes using a ten cent coin as the scraping instrument. The products of this invention do not lend themselves to the standard abrasion tests such as the Wyzenbeek test described in Federal Specification CCC–T–191b, dated May 15, 1951, Method 5304, since they are uniform throughout and there is no definite end point encountered by such abrading apparatus, as in the case of a coated fabric where the end point is taken when the coating is abraded through to the fabric.

Example 2

A fluffy loosely bound batt of .1 denier 1.25 inch staple polyethylene terephthalate fibers weighing 10 ounces per square yard was formed on a card. The batt was immersed in a 5% solution of a polytetramethyleneether glycol/toluene diisocyanate elastomer (same as in Example 1) in dimethyl formamide. The batt was pressed to remove the excess solution. The batt was then subjected to live steam to coagulate the polymer uniformly throughout the batt before it was dried at 250° F.

Upon drying, the fibers became compacted and the resulting material was a fibrous leather-like sheet in which the binder was substantially equally distributed throughout the sheet.

The ratio of fiber to binder was 1 to .8. The dried product had an LPV value of 5000 when tested at 78° F. and 90% relative humidity. There was no apparent failure in the material after 10,000,000 flexes on the Schiltknecht flex apparatus.

*Example 3*

Ten parts of carbon black were milled into 100 parts of a polytetramethyleneether glycol/toluene diisocyanate elastomer (same as Example 1) on a two-roll rubber mill. Example 2 was repeated using a 5% solution of the milled elastomer in dimethyl formamide as the binder in place of that described in Example 2.

The dried product of this example differed only from that in Example 2 in that it had an LPV value of 6000 and was black.

*Example 4*

A leather replacement product was made in accordance with the following continuous procedure: Polyethylene terephthalate .1 denier fiber 2.5 inches long was fed to a card where a fluffy batt weighing 8 ounces per square yard was continuously formed. The batt was continuously plied to form a two ply batt weighing 16 ounces per square yard. The two ply batt was continuously passed through a needle loom to give the batt added strength. A suitable needle loom is illustrated in copending application, S. N. 312,067, filed September 29, 1952, by H. G. Lauterbach. From the needle loom the batt was continuously passed through a heat zone at 300° F. to effect about 15% shrinkage in the area of the batt. The batt was then continuously passed through a 10% solution of a polytetramethyleneether glycol/toluene diisocyanate elastomer, prepared as described below, in dimethyl formamide where the batt was thoroughly impregnated with the solution of the elastomer. The impregnated batt was then continuously immersed in water at room temperature which coagulated the elastomer throughout the batt. The impregnated batt was then dried continuously by passing through a heat zone at 200° F. to evaporate the water and dimethyl formamide. The impregnation and subsequent drying steps compact and consolidate the batt without the application of any pressure treatments to form a leather-like sheet material. The dry impregnated leather-like sheet material was then continuously buffed on one side with a 240J emery covered roll to provide a smooth surface. The smooth surfaced sheet was then continuously spray-coated on the buffed side with the following composition:

| | Parts by weight |
|---|---|
| 50% aqueous latex of a copolymer of butadiene and acrylonitrile | 60.6 |
| 36% aqueous solution of a phenol/formaldehyde resin | 30.3 |
| 7.5% aqueous solution of sodium polyacrylate | 9.1 |
| | 100.0 |

About 1.0 dry ounce of spray coat was applied per square yard. The spray coated sheet was continuously dried by passing through a heat zone and while hot it was next embossed by pressing between cold pressure plates, one of which was steel and had a leather design engraved on its surface.

The polytetramethyleneether glycol/toluene diisocyanate elastomer used in this example was prepared as follows: Three mols of polytetramethyleneether glycol of molecular weight 920 containing 0.02 mol of water is mixed with 2.02 mols of 2,4-tolylene diisocyanate at 100° C for 3 hours. A polyurethane with terminal hydroxyl groups and a molecular weight of 3,110 is formed. 311 parts of this polyurethane and 0.57 part of water are mixed in a Werner-Pfleiderer mixer at 30–35° C. for 10 minutes and then 40 parts of 2,4-tolylene diisocyanate is added and the mass is mixed at 70–75° C. for 2.5 hours. To the viscous reaction mass is added 12.6 parts of water and mixing is continued for 30 minutes while the temperature increases from 70° to 100° C. The rubbery polymer is discharged from the mixer and put on a rubber roll mill where 0.7 part of piperidene per 100 parts of polymer is added for stabilization. After thorough mixing of the stabilizing agent, the elastomer is sheeted off the mill.

The leather replacement product of this example had the appearance, feel and texture of leather such as used in shoe uppers. The ratio of fiber to binder was 1 to .5. Physical properties were:

| | |
|---|---|
| Total weight | 20.0 oz./sq. yd. |
| Leather permeability value | 3000. |
| Tensile strength—1″ strip (avg.) | 87 lbs. |
| Tear strength (ASTM, D624–48, die C) | 22 lbs./inch. (Comparable to leather used for shoe manufacture.) |

The product was useful as a replacement for the leather in shoe uppers. Men's shoes made with the product of this example as the uppers had an acceptable comfort value with respect to moisture transmission.

*Example 5*

A laminated assembly was prepared by carding a batt of heat shrinkable 0.1 denier 1.25 inch staple fibers of polyethylene terephthalate weighing .5 ounce per square yard. The batt was impregnated with a 10% solution of the polytetramethyleneether glycol/toluene diisocyanate elastomer, described in Example 1, in dimethyl formamide and then heated to dry the batt. The batt picked up its own weight of dry elastomer. Eight separate plies of the impregnated batt were then superposed and subjected to a pressure of 750 p. s. i. at 300° F. for 3 minutes. The ratio of binder to fiber was 1:1 and the laminated assembly weighed 8.0 ounces per square yard.

The product had a fibrous leather-like structure.

*Example 6*

The .5 ounce carded batt described in Example 5 was sprayed on each side with a 3% solution of the elastomer, described in Example 1, in dimethyl formamide and then dried. About .5 dry ounce of elastomer was deposited on and in the batt. Fourteen plies of the impregnated batt were superposed in cross-lapped relation. The assembly was subjected to about 800 p. s. i. at 300° F. for 1 minute to form a composite unitary structure. The ratio of binder to fiber was 1:1.

The laminated assembly had the following physical properties:

| | |
|---|---|
| LPV | 2660. |
| Gurley-air porosity | .59 cc./sec. |
| Thickness | 40 mils. |
| Tensile strength—2″ strip | 240 lbs. |
| Tear strength (ASTM, D625–48, die C) | 53.5 lbs./inch. |
| Low temperature—Gurley at zero °F | 2.10 greater than at room temperature. |
| Schiltknecht flex, surface OK at | 10,000,000 flexes. |

The product was useful for shoe uppers.

*Example 7*

A fluffy batt of 3.0 denier, 1.5 inch staple of polyethylene terephthalate fibers weighing six ounces per square yard was formed on a card. The batt was subjected to a dry temperature of 300° F. for two minutes which shrunk the batt 25% in area and compacted the batt. The heat shrunk batt was immersed in the following composition:

|  | Parts by weight |
| --- | --- |
| Polytetramethyleneether glycol/toluene diisocyanate elastomer (same as Example 1) | 9.4 |
| Toluene diisocyanate urea | .6 |
| Dimethyl formamide | 90.0 |
|  | 100.0 |

The impregnated batt was squeezed to remove the excess solution and before the volatile solvent was evaporated it was immersed in water to coagulate the binder uniformly throughout the batt. The batt was dried at 250° F. The dried batt was further condensed and compacted by subjecting it to a pressure of 100 p. s. i. at 250° F. for 3 minutes. The ratio of fiber to binder was about 1 to 1.

The impregnated non-woven web was suitable as a substrate for surface coatings.

*Example 8*

The following ingredients were mixed on a two roll rubber mill in accordance with the well known procedure employed in the rubber industry.

|  | Parts by weight |
| --- | --- |
| Polytetramethyleneether glycol/toluene diisocyanate elastomer (same as in Example 1) | 100 |
| Carbon black | 50 |
| Toluene diisocyanate urea | 4 |

The toluene diisocyanate urea serves as a crosslinking or curing agent for the elastomer. After thorough mixing of the above ingredients they were sheeted out in the form of a film 2.5–3.0 mils thick, weighing about 3.0 ounces per square yard. A mixture of three parts of 3.0 denier, 1.5 inch staple polyethylene terephthalate fibers and one part of 3 denier, 1.5 inch staple viscose rayon fibers were blended and carded into a batt weighing about 3.0 ounces per square yard. A composite assembly was formed of three layers of film and three layers of the batt arranged in the following order:

| First layer | Batt |
| --- | --- |
| Second layer | Film |
| Third layer | Batt |
| Fourth layer | Film |
| Fifth layer | Batt |
| Sixth layer | Film |

The assembly of alternating layers of batt and film were subjected to a pressure of about 600 p. s. i., at 275° F. for about 30 minutes to cure the elastomer. The separate layers were welded together to form a composite unitary structure having a smooth skin of elastomer on one side and a fibrous surface on the other side. The laminated assembly had the following physical properties:

| Total weight | 18.3 oz./sq. yd. |
| --- | --- |
| Thickness | 22 mils. |
| Schiltknecht flex, surface OK at | 1,000,000 flexes. |
| Leather vapor permeability | 1640. |
| Gurley-air porosity (20 oz. cylinder) | 0. |

The product had the appearance of calf skin leather. It was particularly adapted for fabricating ladies' pocketbooks. Other useful products can be made with only one layer of the batt and only one layer of the film.

*Example 9*

A porous paper-like structure was prepared by impregnating a waterleaf of polyethylene terephthalate fibers with a 10% solution of an elastomeric polymer described more fully below. Polyethylene terephthalate staple fibers ⅝ inch in length, three denier per filament, were formed into a waterleaf by making a slurry of the fibers in water and then forming into sheets weighing 2.0 ounces per square yard by conventional paper making techniques. The waterleaf was dried and then impregnated by dipping into a 10% solution of an elastomeric polymer in carbon tetrachloride. The elastomeric polymer was the reaction product of 3 mols of polytetramethyleneether glycol and 2 mols of 2,4-tolylene diisocyanate to form polyurethane, which in turn was reacted with 0.32 mol of water and 2.3 mols of 2,4-tolylene diisocyanate. The excess solution was allowed to drain from the waterleaf and then the volatile component of the impregnating composition was allowed to evaporate almost completely and then the polymer was coagulated by soaking the sample in 5% solution of dimethylpiperazine in methanol, followed by thorough washing with water. The drying of the impregnant concentrates the elastomeric polymer at the fiber cross-over points producing a porous structure.

The final product had the following physical properties:

| Fiber/binder—weight ratio | 1:1.6 |
| --- | --- |
| Bursting strength (p. s. i.) | 102 |
| Elmendorf tear strength (grams) | 554 |
| Thickness (mils) | 25 |

The product was flexible, having the appearance and surface characteristics of blotting paper. It was ideally suited as a stiffener for wearing apparel in the construction of men's jackets. It was also suitable for fabricating into ladies' petticoats which give a flare to outer garments.

Polytetramethyleneether glycol is the preferred glycol for reacting with the 2,4-tolylene diisocyanate to prepare the polymeric elastomers useful in carrying out this invention. Other polyalkyleneether glycols which are representative of the class which may be used in preparing the polymeric elastomers include polyethyleneether glycol, polypropyleneether glycol, polybutyleneether glycol, 1,2-polydimethyleneether glycol and polydecamethyleneether glycol.

The term "polyalkyleneether glycol," as used throughout the specification and claims refers to polyalkeneether glycols containing terminal hydroxy groups. These compounds are ordinarily derived from the polymerization of cyclic ethers such as alkylene oxides or dioxolane or from the condensation of glycols. They are sometimes represented by the formula HO(RO)$_n$H, in which R stands for an alkylene radical and $n$ is an integer greater than 1. In the polyethers useful in preparing the polymeric elastomers of this invention, $n$ is sufficiently large that the polyalkyleneether glycol has a molecular weight of at least 750 and may be as high as 10,000. Polyalkyleneether glycols having a molecular weight of 750 to 3500 was preferred. Not all the alkylene radicals present need be the same. Polyglycols formed by the copolymerization of a mixture of different alkylene oxides or glycols may be used, or the polyglycol may be derived from a cyclic ether such as dioxolane, which results in a product having the formula HO(CH$_2$OC$_2$H$_4$)$_n$H. Examples of compounds which contain diverse alkylene radicals and which are useful in the preparation of elastomers are those polyethers described in United States Patent No. 2,492,955 to Ballard et al. which have molecular weights in the desired range. The alkylene radicals may be straight-chain or may have a branched chain as the compound known as polypropyleneether glycol, which has the formula

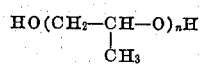

Any of a wide variety of organic diisocyanates may be employed in preparing the polymeric elastomers of this invention including aromatic, aliphatic and cycloaliphatic diisocyanates and combinations of these types. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i. e., those in which each of the two isocyanate groups is attached directly to an aromatic ring, are preferred. In general they react more rapidly with the polyalkyleneether glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanatoaryl) ureas such as di(3-isocyanato-4-methylphenyl) urea, which are the subject of U. S. application Serial No. 365,280, filed June 30, 1953, by Eric Barthel, Jr., may be used.

The leather permeability values were carried out by filling a three inch diameter crystallizing dish with 12 mesh calcium chloride, covering the dish with membrane of the substance to be tested and placing the covered dish in an atmosphere of high humidity (23° C. and 90% relative humidity). The assemblage is weighed at intervals and the equilibrium rate of sorption is recorded as grams of water per 100 sq. meters of surface per hour which is the leather permeability value. This is a modification of a test developed by the Bureau of Standards, Kanogy & Vickers, J. Res. Nat. Bur. of Std., 44, 347–62, 1950 (April).

The Schiltknecht flex test was carried out on apparatus described in Bulletin No. 105 of Alfred Suter, 200 Fifth Avenue, New York city, N. Y.

The small denier fibers (less than 1.0 denier per filament) may be prepared by superstretching the polymeric linear terephthalate esters in accordance with the procedure described in U. S. Patent 2,578,899, issued December 18, 1951, to A. Pace, Jr. There is no particular lower limit for the denier of the polymeric linear terephthalate fibers useful in this invention other than the ability to make fibers of extremely low denier. Fibers having a diameter of .1 micron (0.00008 denier per filament) may be used in practicing this invention. Filaments having a denier greater than 1.0 denier per filament result in sheets which have poor scuff resistance in comparison to leather.

For leather replacement products which require high scuff resistance, fine denier fibers, i. e. less than 1.0 denier per filament are required. For other uses such as, e. g., substrates for flexible surface coatings and paper-like products much higher denier fibers may be employed. There is no particular upper limit for the denier of the polymeric linear terephthalate fibers for products which do not require high scuff resistance. Fibers having a denier of 50 to 70 produce useful non-woven fabrics and where extremely coarse felt is desired, even coarser filaments having a denier of 100 to 150 may be used. The fiber may be straight or crimped.

The ratio of fiber to binder in the various examples varies between 1.0 to .5 and 1.0 to 1.6. While this represents the preferred range, useful products can be prepared where the ratio of fiber to binder is between 1.0 to .3 and 1.0 to 2.0.

The non-woven webs of this invention may be surface coated with water vapor transmittable coatings such as described in copending application S. N. 439,900, filed June 28, 1954, by R. J. Mayfield and S. N. 337,671, filed February 18, 1953; S. N. 337,672, filed February 18, 1953; and S. N. 364,487, filed June 26, 1953, by H. L. Jackson.

In place of the polyethylene terephthalate fibers used in the specific examples, it is to be understood that the highly polymerized esters obtained by the reaction of terephthalic acid and polymethylene glycols having more than 2 but not more than 10 methylene groups may also be used in carrying out this invention; such as, e. g. trimethylene glycol, tetramethylene glycol, pentamethylene glycol, heptamethylene glycol, octamethylene glycol, monomethylene glycol and decamethylene glycol; the glycols having 2 to 4 methylene groups are preferred.

While the relative thickness (denier) of the fibers is an important consideration in practicing this invention, the length of the fibers is not critical and they can vary from as little as .01 inch up to 8 inches in length or greater. The fiber length is determined primarily by the method of preparing the batt of fibers. For instance, if the batt is prepared by paper making techniques, fibers no longer than about .5 inch are employed. Batts prepared by air-blowing techniques and web making apparatus as described in U. S. Patent 2,451,915, issued October 19, 1948, to Francis M. Buresh, employ fibers not greater than about 1.5 inches in length. Batts of fibers of 1.5 inch length and greater are preferably prepared on carding machines.

As illustrated by Example 8, mixtures of polymeric linear terephthalate fibers and dissimilar fibers may be employed in practicing this invention. When a mixture of fibers is employed the polymeric linear terephthalate fibers should be present in a predominating proportion. Other fibers which may be blended with the polymeric linear terephthalate fibers include nylon, polyacrylonitrile, cotton, wool, glass, and viscose rayon fibers.

The batts of polymeric linear terephthalate may be brought in contact with the polymeric diisocyanate elastomer binder in a variety of ways, such as impregnating the batt with a solution or dispersion of the binder or simple mixing where the binder in particulate form is brought in contact with the fibers. When the binder is added as a dispersion or dry particles heat and pressure are required to bring about coalescence of the binder. Also, preformed films of the polymeric diisocyanate elastomeric binder may be brought in contact with the batts of polymeric linear terephthalate fibers.

In the examples dimethyl formamide is used as the solvent for dispersing elastomeric binder to form the impregnating medium. The compounded uncured elastomers used in this invention may be dissolved in other solvents to form the impregnating composition. The action of solvents appears to be quite specific and varies from one elastomer to another. The uncured reaction product made from a polytetramethyleneether glycol, 2,4-tolylene diisocyanate and water will form a dispersed free flowing gel or solution in concentrations of 5 to 10%, by weight, in dimethyl formamide, tetrahydrofuran, methyl ethyl ketone, toluene, nitrobenzene, o-dichlorobenzene, tetrachloroethane, chloroform, thiophene, a 50/50 mixture of tetrahydrofuran and methyl ethyl ketone, a 50/50 mixture of tetrahydrofuran and benzene, pyridine, cyclohexanone, and the diethyl ether of ethylene glycol.

Color can be imparted to the sheet material of this invention by incorporating dyes or pigments in the polymeric binder, or by dyeing the batt or using pre-dyed or pre-pigmented fibers. Preferably, color is added by dyeing the batt of fibers.

An advantage of this invention is that it provides sheet material having great scuff resistance combined with water vapor permeability, high tensile and tear strengths and satisfactory flex-life.

The products of this invention are useful as leather replacements in the manufacture of ladies' handbags, men's and ladies' jackets, belts, shoe uppers, protective clothing, luggage, upholstery, bookbinding and novelties.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The invention claimed is:

1. A sheet material comprising a non-woven batt comprising polymeric linear terephthalate ester filaments bound together with the polymeric reaction product of a polyalkyleneether glycol, an organic diisocyanate and a chain extending compound containing active hydrogen atoms.

2. The product of claim 1 in which the ratio of filaments to binder is within the range of 1 to .3 and 1 to 2.0.

3. The product of claim 1 in which the polymeric linear terephthalate ester is the ester of terephthalic acid and a glycol having the empirical formula $$HO(CH_2)_nOH$$

where $n$ is a whole number within the range of 2 to 4, inclusive.

4. The product of claim 1 in which the polymeric linear terephthalate ester is polyethylene terephthalate.

5. The product of claim 1 in which the polyalkyleneether glycol has a molecular weight of 750 to 10,000.

6. The product of claim 1 in which the polyalkyleneether glycol has a molecular weight of 750 to 3500.

7. The product of claim 1 in which the binder is the polymeric reaction product of one mol polytetramethyleneether glycol, 2.1 mols of 2,4-tolylene diisocyanate and 5.11 mols of water.

8. The product of claim 1 in which said polymeric reaction product is cross-linked with toluene diisocyanate urea.

9. The product of claim 1 in which substantially all the filaments have a denier less than one.

10. The product of claim 1 in which the ratio of binder to filaments is greater in the surface portion of the sheet than in the middle portion.

11. The product of claim 1 in which the binder is substantially equally distributed throughout the sheet.

12. The process of preparing non-woven sheet material comprising forming a batt of loosely bound polymeric linear terephthalate ester filaments, distributing throughout said batt the polymeric reaction product of a polyalkyleneether glycol, an organic diisocyanate and a chain extending compound containing active hydrogen atoms, heating and pressing the batt to consolidate the filaments and said polymeric reaction product into a unitary structure.

13. The process of claim 12 in which the polymeric linear terephthalate ester filaments are polyethylene terephthalate.

14. The process of claim 13 in which the polymeric linear terephthalate filaments are less than one denier per filament.

15. The process of claim 12 in which the polymeric reaction product is the reaction product of one mol of polytetramethyleneether glycol, 2.1 mols of 2,4-tolylene diisocyanate and 5.11 mols of water.

16. The process of preparing non-woven sheet material comprising forming a batt of loosely bound polymeric linear terephthalate ester fibers, needle punching the batt, heating the batt to cause the fibers to shrink, impregnating the shrunken batt with a solution of the polymeric reaction product of a polyalkyleneether glycol, an organic diisocyanate and a chain extending compound containing active hydrogen atoms in a volatile water-soluble organic solvent, treating the impregnated batt with water before the volatile organic solvent is evaporated, heating to evaporate the organic solvent and water, subjecting the dry impregnated batt to heat and pressure, buffing at least one side of the dry impregnated batt to remove the protruding portions of fibers, and coating the buffed side of said sheet with a water vapor transmittable coating.

17. The process of preparing non-woven sheet material comprising a batt of loosely bound polyethylene terephthalate ester fibers, needle punching the batt, heating the batt to cause it to shrink, impregnating the shrunken bat with a solution of the polymeric reaction product of one mole of polytetramethyleneether glycol per 2.1 mols of 2,4-tolylene diisocyanate and 5.11 mols of water, and toluene diisocyanate urea, in a volatile water-soluble organic solvent, treating the impregnated batt with water before the volatile organic solvent is evaporated, heating to evaporate the volatile components, and subjecting the dry impregnated batt to heat and pressure.

18. The process of preparing a laminated assembly comprising forming a non-woven batt comprising polymeric linear terephthalate fibers, separately preparing a film comprising the reaction product of a polyalkyleneether glycol, an organic diisocyanate and a chain extending compound containing active hydrogen, and toluene diisocyanate urea, superposing at least one layer of said film on at least one layer of said batt, subjecting the superposed layers to heat and pressure to form a unitary structure.

19. The process of claim 18 in which said polymeric linear terephthalate is polyethylene terephthalate.

20. The process of claim 18 in which said reaction product is the reaction product of one mol of polytetramethyleneether glycol, 2.1 mols of 2,4-tolylene diisocyanate and 5.11 mols of water.

References Cited in the file of this patent
UNITED STATES PATENTS

| | | |
|---|---|---|
| 2,676,128 | Piccard | Apr. 20, 1954 |
| 2,689,199 | Pesce | Sept. 14, 1954 |
| 2,692,873 | Langerak | Oct. 26, 1954 |
| 2,692,874 | Langerak | Oct. 26, 1954 |